United States Patent [19]

Bean et al.

[11] 4,059,911

[45] Nov. 29, 1977

[54] TRACK FILLER ATTACHMENT FOR CENTER PIVOT IRRIGATION SYSTEMS

[76] Inventors: Roland C. Bean; Bruce L. Bean, both of Star Route, Burley, Idaho 83318

[21] Appl. No.: 611,179

[22] Filed: Sept. 8, 1975

[51] Int. Cl.$^2$ ............................................. E02F 5/22
[52] U.S. Cl. .................................. 37/142.5; 239/177; 172/25; 172/574
[58] Field of Search ................. 37/142.5; 172/23, 25, 172/264, 383, 386, 535, 567, 568, 572, 574, 576, 686, 691, 669–671, 673, 676, 176, 181, 599–603; 111/6, 7, 85; 239/177, 212, 159

[56] References Cited

U.S. PATENT DOCUMENTS

| 516,750 | 2/1894 | Blaine | 37/142.5 X |
|---|---|---|---|
| 605,963 | 6/1898 | Linthicum, Jr. | 172/574 X |
| 999,005 | 7/1911 | Bateman | 172/574 X |
| 1,035,450 | 8/1912 | Klug | 172/572 X |
| 1,186,365 | 6/1916 | Allmon | 172/673 X |
| 1,260,174 | 3/1918 | Fisher | 172/574 |
| 1,620,697 | 3/1927 | Spence | 172/691 X |
| 1,818,656 | 8/1931 | Taylor et al. | 172/574 X |
| 1,833,409 | 11/1931 | Cecil | 172/176 X |
| 2,430,434 | 11/1947 | Rutter | 172/574 X |
| 2,826,131 | 3/1958 | Willet | 172/574 X |
| 2,829,577 | 4/1958 | Williams | 172/383 |
| 2,851,939 | 9/1958 | Whisenant | 172/572 X |
| 2,892,593 | 6/1959 | Smeltzer | 172/25 X |
| 3,244,237 | 5/1966 | Keplinger et al. | 172/574 X |
| 3,760,885 | 9/1973 | McKenzie | 172/574 |

FOREIGN PATENT DOCUMENTS

| 433,601 | 1/1912 | France | 172/181 |
|---|---|---|---|
| 283,495 | 4/1915 | Germany | 172/181 |
| 105,671 | 4/1917 | United Kingdom | 172/572 |
| 175,323 | 4/1964 | U.S.S.R. | 172/676 |
| 270,363 | 8/1970 | U.S.S.R. | 172/574 |

*Primary Examiner*—E. H. Eickholt
*Attorney, Agent, or Firm*—Oliver D. Olson

[57] ABSTRACT

A pair of laterally spaced plow discs are supported by a framework which is mounted resiliently adjacent each pair of support wheels of a center pivot irrigation system in position to engage the laterally spaced mounds of earth produced as the wheels form a depressed annular track in the soil during rotation of the irrigation system, the plow discs being disposed adjustably to direct the mounded earth back into the track and thereby level the ground.

9 Claims, 5 Drawing Figures

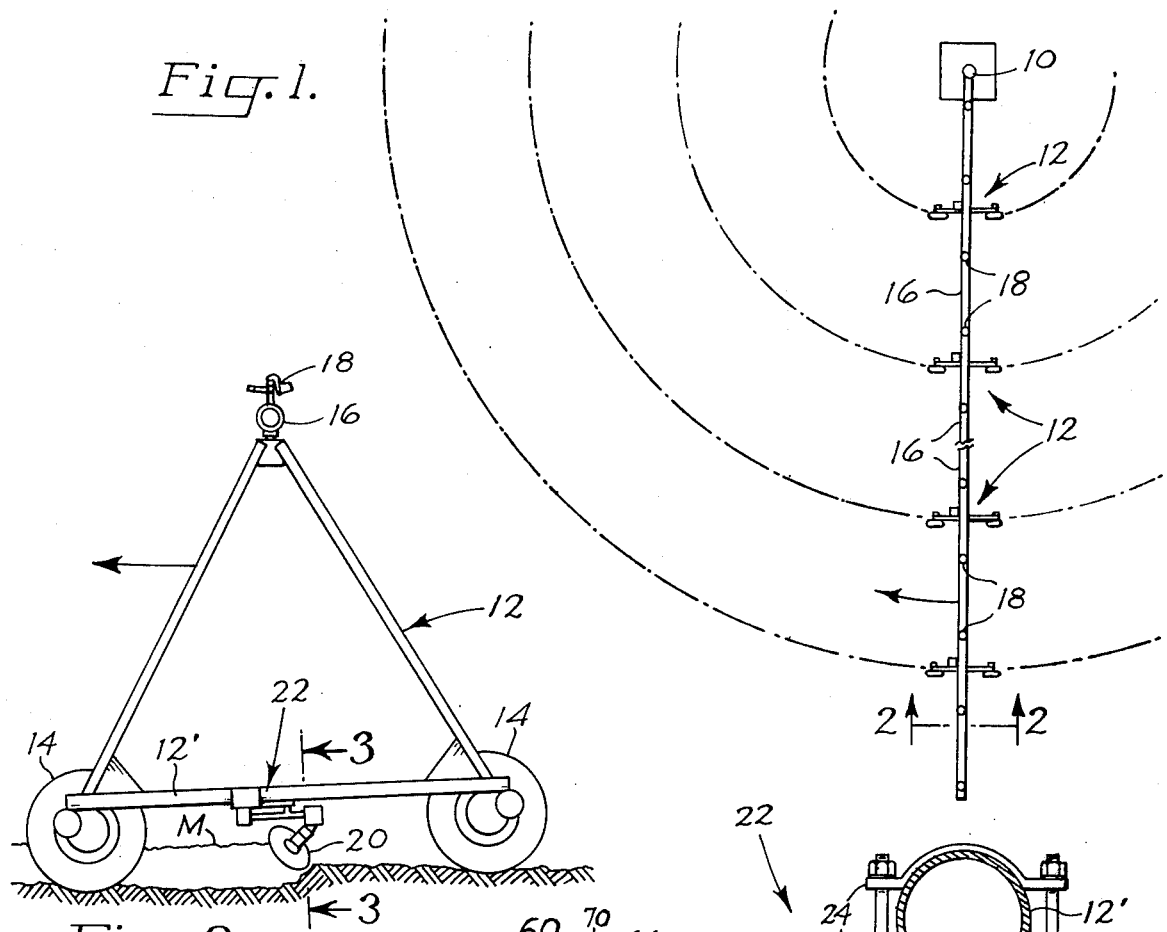
Fig. 1.
Fig. 2.
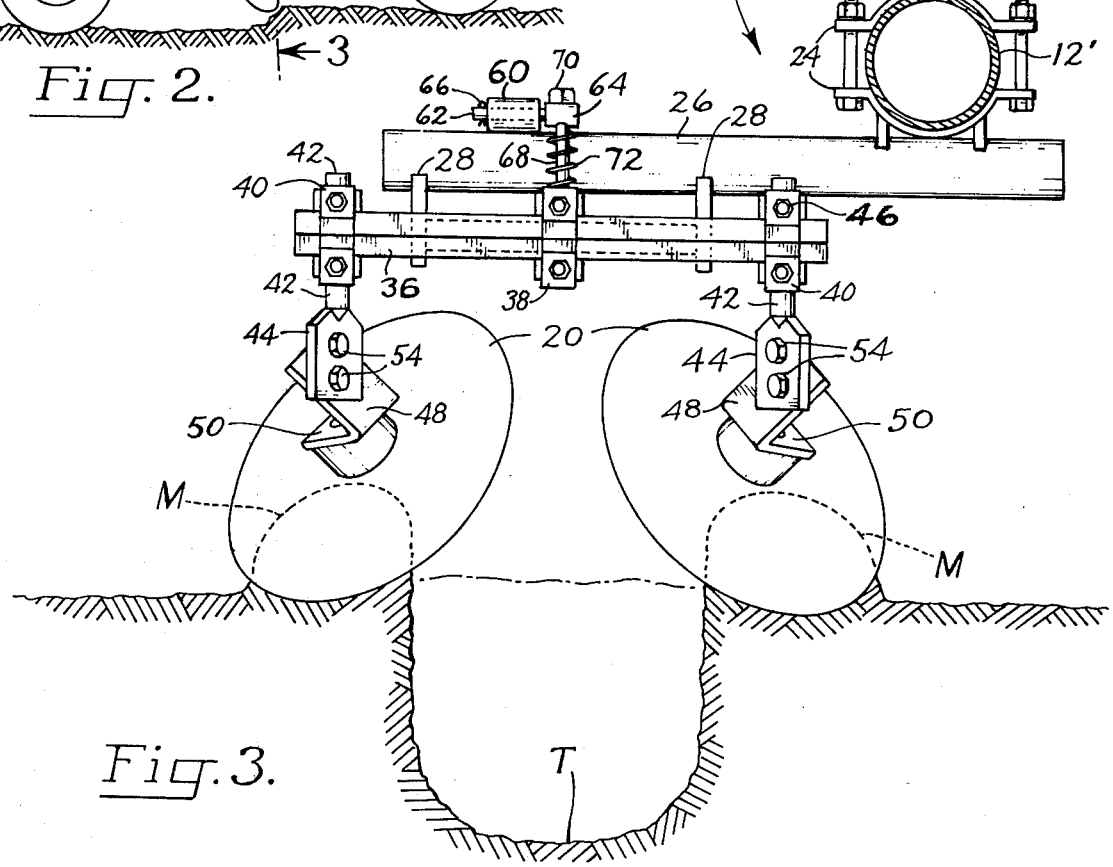
Fig. 3.

TRACK FILLER ATTACHMENT FOR CENTER PIVOT IRRIGATION SYSTEMS

BACKGROUND OF THE INVENTION

This invention relates to center pivot irrigation systems. In particular, it relates to an attachment for such systems which functions during operation of the latter to fill in the track formed by the support wheels of the system.

In the use of center pivot irrigation systems, the wheels which carry the support towers tend to form depressed tracks by the displacement of dirt into opposed mounds. Since the systems are generally in continuous operation during the growing season, making one revolution in approximately one and one-half days, these tracks and associated mounds can become quite pronounced. This ground must be leveled in order that harvesting or other equipment may be moved over the area at reasonable speeds without being subject to severe damage. Leveling heretofore has been accomplished by filling in the depressed tracks with the mounded earth either by manual labor or by the operation of a power driven scraper, bulldozer, or other suitable equipment. Both of these methods are time consuming and costly.

SUMMARY OF THE INVENTION

In its basic concept the track filler of this invention comprises earth moving means mounted adjacent each pair of support wheels of a center pivot irrigation system in position to fill in the associated wheel track with the earth displaced by the support wheels.

It is by virtue of this basic concept that the principal objective of this invention is achieved; namely, to overcome the aforementioned disadvantages heretofore associated with operation of center pivot irrigation systems.

Another important object of this invention is to provide a track filler attachment of the class described that may be easily attached to center pivot irrigation systems of various designs.

Still another object of this invention is to provide a track filler attachment of the class described wherein the earth moving means is mounted for displacement to prevent damage thereto when encountering rocks and other foreign objects.

A further object of this invention is to provide a track filler attachment of the class described which is of simplified construction for economical manufacture, is of rugged design permitting severe treatment in use and requires minimum maintenance and repair.

The foregoing and other objects and advantages of this invention will appear from the following detailed description taken in connection with the accompanying drawings of a preferred embodiment.

BRIEF DESCRIPTION OF THE DRAWINGS

FIG. 1 is a foreshortened plan view of a center pivot irrigation system incorporating therewith a track filler attachment embodying the features of this invention.

FIG. 2 is a sectional view on an enlarged scale taken on the line 2—2 of FIG. 1.

FIG. 3 is a sectional view on an enlarged scale taken on the line 3—3 of FIG. 2.

DESCRIPTION OF THE PREFERRED EMBODIMENT

Figure 4:
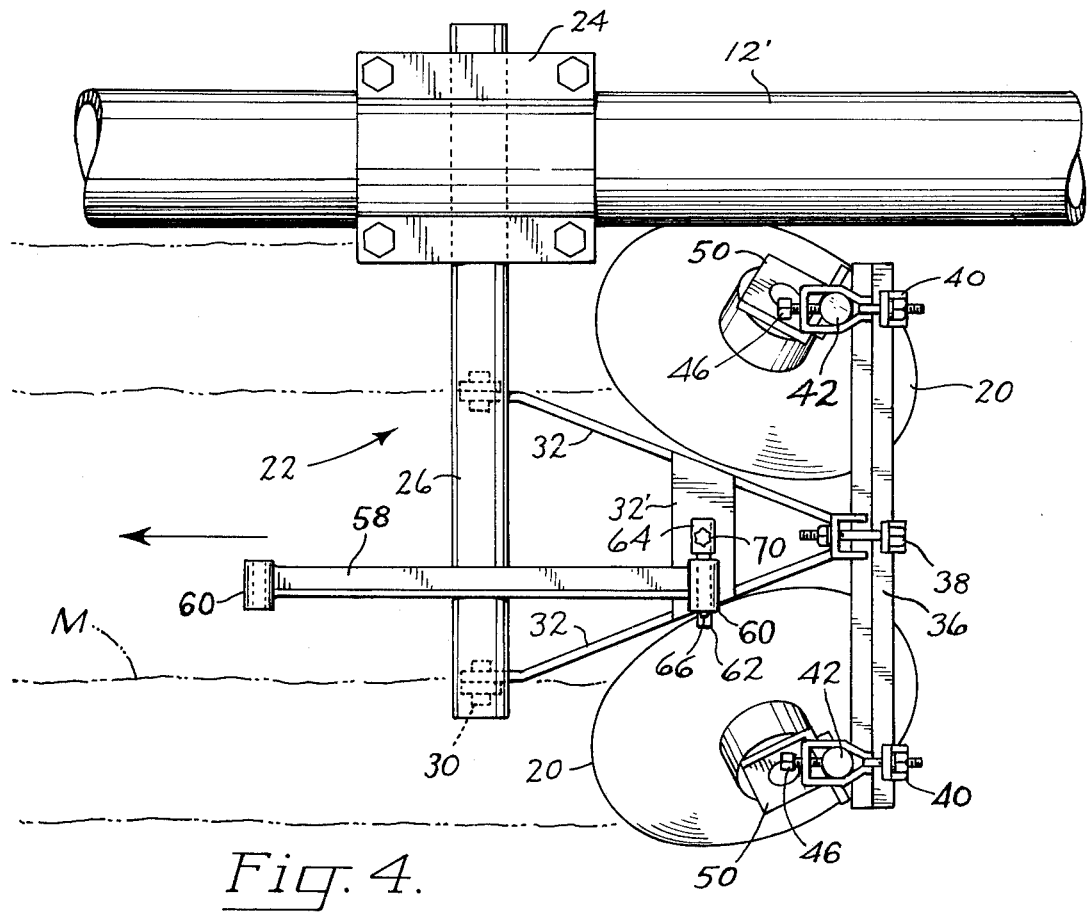
FIG. 4 is a fragmentary plan view as viewed from the top of FIG. 3.

Referring to FIG. 1, the track filler attachment of the present invention is generally utilized on a center pivot irrigation system which includes a center pivot assembly 10 and a plurality of support towers 12 each mounted on a pair of powered wheels 14 spaced apart by the bottom beam 12' of the tower. The support towers are radially located at spaced intervals from the center pivot assembly. Irrigation pipe 16 ties the support towers to each other and to the pivot so that when the wheels of the support towers are driven, they traverse a circular path, as shown. Water is supplied through the pipe 16 to sprinkler heads 18 located along the pipe to irrigate this circular area during rotation of the system about the center pivot assembly. FIG. 2 shows one of the support towers in detail with the track filler attachment mounted thereon.

Figure 5:
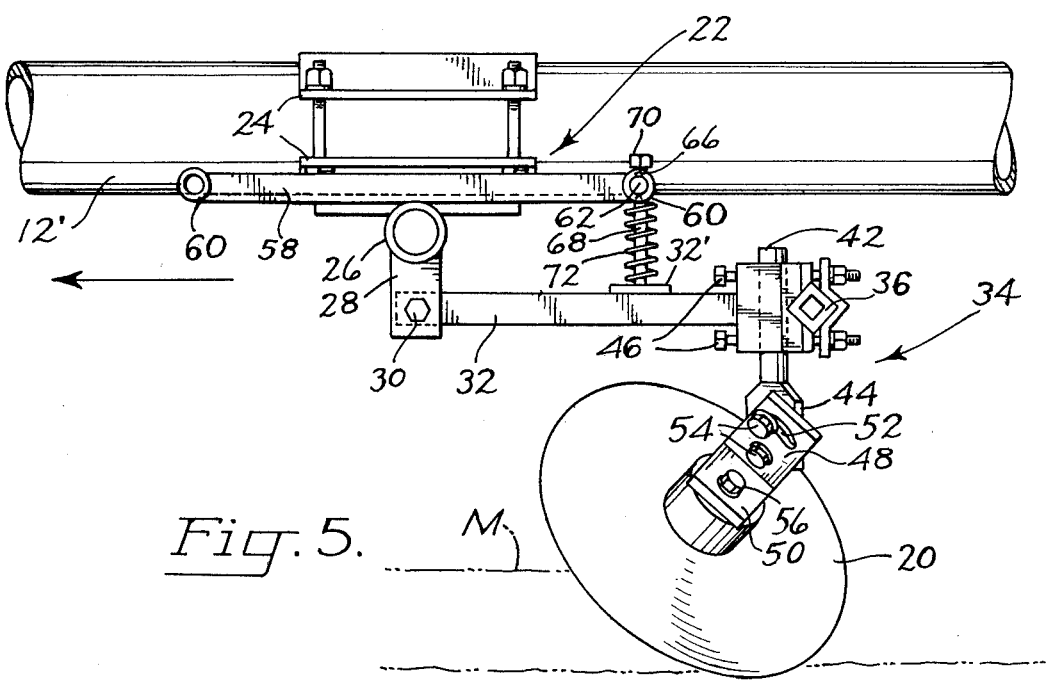
FIG. 5 is a fragmentary elevation view as viewed from the left in FIG. 3.

Referring now to FIGS. 3, 4, and 5, the track filler attachment includes earth moving means for pushing the mounds M of dirt formed by wheels 14 back into the wheel track T. In the embodiment illustrated, the earth moving means comprise circular discs 20 such as are used on common disc plows. Two such discs are employed with one positioned on each side of wheels 14. Framework 22 mounts the discs on the support tower and adjustment means orients them in proper working position.

To this end, clamp 24 releasably attaches to the bottom beam 12' of the support tower. Mounting bar 26 is secured to the lower section of the clamp, as by welding, and extends horizontally outward from the support tower substantially parallel to pipe 16. Lugs 28, defining central mounting holes, are secured to and depend from the outer and medial portions of the mounting bar. Pivotally attached at one end to the lugs, as by bolts 30, are frame members 32 which converge outwardly and are interconnected intermediate their ends by plate 32', thereby forming an A-frame.

The discs 20 are mounted to the converging end of frame members 32 by adjustment means 34 in order to adjust the orientation of the discs relative to the mounds of dirt. In the embodiment illustrated, the adjustment means includes slide bar 36 releasably attached intermediate its ends to frame 32, as by means of clamp 38 disposed parallel the mounting bar 26 and sliding clamps 40 which fit each end of slide bar 36 for releasable sliding engagement therewith. Pivot members, comprising shaft 42 and tabs 44, are rotatably mounted about their vertical axes in the sliding clamps. They are releasably clamped therein by such means as set screws 46 (FIG. 4).

Angle brackets provide one section 48 pivotally attached to tabs 44, and a second section 50 attached to the discs 20. Each section 48 is provided with a lower hole and an upper arcuate slot 52 (FIG. 5) through which bolts 54 pass for threaded engagement with tabs 44. Each section 50 is provided with a hole through which a bolt 56 passes to attach the disc 20.

A beam 58 is secured to mounting bar 26 intermediate the lugs 28. Each end of the rod supports a bushing 60 in which pin 62 is rotatably carried. The pin has an enlarged head 64 and is retained removably in the bushing by such means as cotter pin 66 (FIG. 3).

An elongated pin 68 is secured to and extends upward from the plate 32' of the A-frame, and passes through an opening in the head 64. This end of the pin 68 is threaded, to removably receive a nut 70 by which the pin is secured to the head 64. The A-frame and supported discs 20 thus are supported in operative position for engagement of the mounds M by the discs.

Means preferably is provided by which the discs are thus supported resiliently for upward deflection to accommodate uneven terrain and rocks or other obstacles. This is provided, in the embodiment illustrated, by coil dampener spring 72 which freely surrounds pin 68, abutting head 64 at its upper end and plate 32' at its lower end. The spring urges the discs resiliently downward to normal operating position in contact with the mounds of soil, and yet allows the discs to deflect upward upon engagement with obstacles.

In the operation of the track filler described hereinbefore, one is attached to the bottom beam 12' of each support tower of a central pivot irrigation system, as illustrated in the drawings, just prior to the last rotation which completes the irrigation. The adjustment means 34 is utilized to position the discs 20 operatively at ground level but intercepting the mounds M to opposite sides of the depressed track T, as particularly illustrated in FIG. 3. Thus, sliding clamps 40 are adjusted along slide bar 36 to adjust the lateral working dimension between the discs 20 to match the lateral spacing of the earth mounds M. The shafts 42 are adjusted vertically relative to their clamps 40 to adjust the vertical position of the discs 20 relative to ground level. The shafts 42 are adjusted rotationally about their axes and bracket sections 48 are adjusted angularly relative to their tabs 44 to orient the discs to optimum angularity providing most efficient return of the dirt into the track formed by wheels 14.

As the tower is driven in its circular path during its final round of irrigation, the mounds M formed by the wheels due to displacement of the soft plowed dirt under the weight of the system are redeposited back into the track by the discs. If the wheels 14 should traverse irregular terrain or encounter obstacles, such as rocks, the discs 20 will be allowed to move upward thereover by means of the pivotal mounting 30 of frame 32. In such event, spring dampener 72 biases the discs back against the mounded dirt as soon as the obstacle is passed, to continue filling of the track.

If it is desired to operate the irrigation system in a counterclockwise direction rather than in the clockwise direction as shown, the attachment may be reversed on the support tower frame. To reverse the attachment, pin 62 is removed from the right hand bushing 66 of FIG. 4, and bolts 30 are removed from lugs 28. The frame member 32 is thus free and may be reversed end for end for reattachment to the lugs by the bolts. Pin 62 is then inserted into the other bushing 66 and the attachment is ready for operation again.

It will be apparent to those skilled in the art that various changes may be made in the size, shape, and arrangement of parts described hereinbefore. For example, although the adjustment means described is preferred for its simplicity, rugged construction and positive operation, other configurations may be substituted for certain or all of its elements. Further, although the described means for mounting the track filler to the support tower is again preferred for the aforesaid reasons, other elements may be substituted therefore. Still further, the discs 20 may be replaced by non-rotatable blades, or by a single member providing a pair of non-rotatable, angularly disposed blades, or by any other suitable form of earth moving means. Further, although the track filler is disclosed herein as being attached to each support tower between the pair of wheels 14, it may be attached forwardly of the wheel leading in the direction of rotation of the assembly, or, alternatively, rearwardly of the wheel trailing in the direction of rotation of the assembly. These and other modifications may be made, as desired, without departing from the spirit of this invention.

Having thus described our invention and the manner in which it may be used, we claim:

1. A track filler in combination with a center pivot irrigation system having a plurality of support towers each mounted on wheels which, upon rotation of the system, retrace their paths to form depressed annular tracks in the ground by displacing earth to the opposite sides of the track and forming raised mounds thereof, the track filler comprising:
   earth moving means attached to each wheelmounted support tower in position to extend transversely across and engage said opposed earth mounds upwardly from substantially ground level and arranged upon repeated rotation of the irrigation system to move the mounded earth back into the track, whereby substantially to level the ground across said track.

2. The combination of claim 1 including mounting means for supporting the earth moving means, and attaching means on the mounting means for securing the latter detachably to the support tower.

3. The combination of claim 2 wherein the mounting means includes adjustment means for adjusting the vertical position of the earth moving means relative to ground level.

4. The combination of claim 2 wherein the mounting means includes adjustment means for adjusting the angular position of the earth moving means relative to the earth mounds.

5. The combination of claim 2 wherein the mounting means includes adjustment means for adjusting the lateral working dimension of the earth moving means.

6. The combination of claim 2 wherein the mounting means includes resilient dampener means for urging the earth moving means toward ground level and allowing upward deflection of the earth moving means upon engagement with an obstacle.

7. The combination of claim 2 wherein
   a. the attaching means comprises a clamp releasably attachable to the support tower, and
   b. the mounting means comprises
      1. a mounting bar rigidly attached to the clamp and extending laterally therefrom to locate the earth moving means for engaging the earth mounds,
      2. a frame mounting the earth moving means on one end and pivotally attached to the mounting bar at its other end for vertical displacement of the earth moving means, and
      3. spring dampener means located between the mounting bar and the frame for urging the earth moving means resiliently downward and allowing upward displacement of the earth moving means against the resilient resistance of the spring dampener means upon engagement of the earth moving means with an obstacle.

8. The combination of claim 1 wherein the earth moving means comprises a pair of plow discs spaced apart laterally for engaging the opposed earth mounds and disposed angularly to move the earth of said mounds back into the track, and including mounting means for supporting said plow discs, and attaching means on the mounting means for securing the latter detachably to the support tower, the mounting means including adjustment means for adjusting the plow discs vertically relative to ground level, angularly relative to the earth mounds and laterally relative to the earth mounds.

9. A track filler for use with a center pivot irrigation system having a plurality of support towers each mounted on wheels which, upon rotation of the system, form a depressed annular track in the ground by displacing earth to the opposite sides of the track and forming raised mounds thereof, the track filler comprising:

a. earth moving means adapted for attachment to each wheel-mounted support tower in position to extend transversely across and engage said opposed earth mounds upwardly from substantially ground level and arranged upon rotation of the irrigation system to direct the mounded earth back into the track, whereby substantially to level the ground across the track, b. mounting means for supporting the earth moving means, and c. attaching means on the mounting means for securing the latter detachably to the support tower, d. the attaching means comprising a clamp releasably attachable to the support tower, and e. the mounting means including adjustment means for adjusting the vertical portion of the earth moving means relative to ground level and comprising
 1. a mounting bar rigidly attached to the clamp and extending laterally therefrom to locate the earth moving means for engaging the earth mounds,
 2. a frame mounting the earth moving means on one end and pivotally attached to the mounting bar at its other end for vertical displacement of the earth moving means, and
 3. spring dampener means located between the mounting bar and the frame for urging the earth moving means resiliently downward and allowing upward displacement of the earth moving means against the resilient resistance of the spring dampener means upon engagement of the earth moving means with an obstacle, f. the earth moving means comprising a pair of spaced earth moving members and the adjustment means comprising
 1. a slide bar releasably attached intermediate its ends to said one end of the frame, parallel to the mounting bar,
 2. a pair of sliding clamps configured for releasable, sliding, clamping engagement with the slide bar,
 3. a pair of pivot plates rotatably mounted about their vertical axes one in each of the sliding clamps, and
 4. a pair of angled brackets each having one of its legs pivotally mounted to one of the pivot plates, and the other of its legs carrying one of the earth moving members.

* * * * *

UNITED STATES PATENT OFFICE
CERTIFICATE OF CORRECTION

PATENT NO. : 4,059,911
DATED : 29 November 1977
INVENTOR(S) : Roland C. Bean and Bruce L. Bean It is certified that error appears in the above-identified patent and that said Letters Patent are hereby corrected as shown below:

Column 4, line 16, "repeated" should appear after "upon";

Column 4, line 21, "wheelmounted" should read --wheel-mounted--.

Signed and Sealed this

Fourteenth Day of March 1978

[SEAL]

Attest:

RUTH C. MASON
Attesting Officer

LUTRELLE F. PARKER
Acting Commissioner of Patents and Trademarks